March 31, 1931.   W. N. VANCE   1,798,768
LOCKER HOOK
Filed April 22, 1929
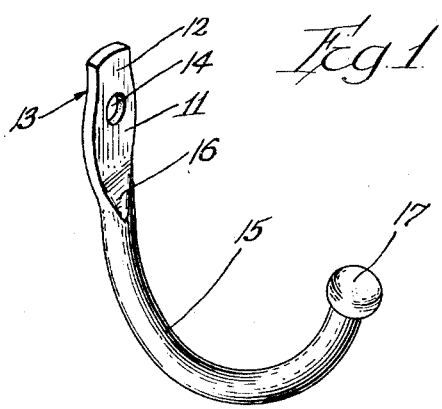
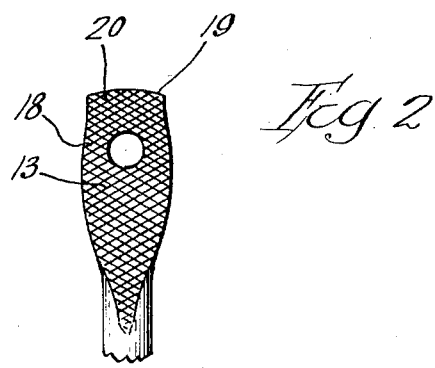
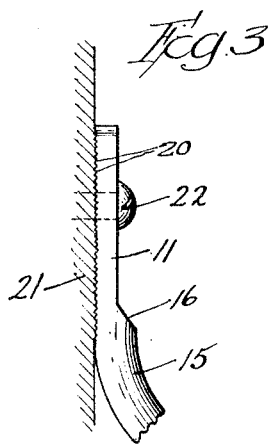
Inventor:
Walter N. Vance
By Cheever, Cox & Moore
Attys Patented Mar. 31, 1931

1,798,768

UNITED STATES PATENT OFFICE

WALTER N. VANCE, OF NORTH AURORA, ILLINOIS, ASSIGNOR TO LYON METAL PRODUCTS, INCORPORATED, OF AURORA, ILLINOIS, A CORPORATION OF ILLINOIS

LOCKER HOOK

Application filed April 22, 1929. Serial No. 356,992.

This invention relates in general to hooks and has more particular reference to hooks for lockers. An object of the invention is the provision of a hook of new and improved construction which permits of relatively tight gripping engagement with a supporting wall when fastened into position by a single fastening means.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a locker hook constructed in accordance with my invention;

Fig. 2 is an enlarged rear elevation of the portion of the hook which engages the locker or other wall, and Fig. 3 is a partial side elevation showing engagement between the hook and wall.

I have shown on the drawing a hook comprising an upper or supporting part 11 having a substantially plane front surface 12 and a rear wall engaging surface 13. A hole 14 is provided through the part 11 for receiving a screw or other fastening device for attaching the hook to the wall of a locker or other surface. The hook portion 15 comprises a curved arm extending downwardly at 16 from the supporting part 11 and curving forwardly and upwardly to provide a hanger for clothing or other articles. At its free end, the hook portion 15 is formed preferably with a head 17 of generally spherical contour.

In order to establish firm contact of the supporting part 11 with the wall to which it is attached, and to prevent lateral movement or dislocation of the hook with respect to the supporting wall during use, the rear face 13 of the supporting part 11 is roughened to provide numerous independent points of contact of said face with the wall. The rear surface 13 is formed by knurling the surface with a plurality of crossed grooves 18 and 19 positioned in relatively close relationship, thereby forming innumerable separated knife-like edges 20 at the tops of each of the grooves which bite into the contacting wall surface at a corresponding number of points.

This construction permits the hook to be applied to the supporting wall 21, as shown in Fig. 3, by a single screw 22 or other fastening device. When the screw is tightened, the pressure of the face 13 against the wall 21 is augmented and the substantially non-slipping frictional contact thereby established cooperates functionally with the screw to maintain the hook body in substantially non-slipping relationship with respect to the wall. This construction eliminates the necessity for employing a plurality of fastening devices to prevent slipping and turning, and the firm grip established between the face 13 and the supporting wall by holding said face in substantially immovable relationship prevents the screw 22 from becoming accidentally loosened.

In carrying out the invention, rounded iron rods or wire is used for making the hooks. A ball head, to make the head 14, is upset on the wire or rod body similar to the way bolts are headed. The end of the wire opposite the head is then flattened by striking the same a heavy blow such as by inserting the rod under a trip hammer. A die is provided under the trip hammer and has a plurality of serrations formed thereon so that when the rod or wire is struck by the hammer, the serrations are formed on the back face of the hook. The hammer blow causes the end to be flattened as indicated at 11 which causes the outer or attaching end of the hook to be somewhat broader and considerably flatter than the normal body portion 15 of the hook. After the attaching end of the hook has been flattened, it is perforated by placing the same under a punch press. All the operations are performed cold in a press to provide the present hook which can be manufactured quicker and more economically than any hook of the present type. However, the ball head 17 of the hook is formed by a heading operation similar to the manner in which bolts are headed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A hook adapted to be formed from rod iron or wire material having its free end formed with a ball head by a heading operation, and its attaching end flattened and provided with serrations by a pounding operation, said flattened end being perforated by a stamping operation, said serrations comprising a multiplicity of minute projections to prevent turning movement of the hook on an attaching surface.

In witness whereof, I have hereunto subscribed my name.

WALTER N. VANCE.